No. 636,097. Patented Oct. 31, 1899.
V. ARCIONI.
ELECTRICAL MEASURING INSTRUMENT.
(Application filed May 10, 1899.)
(No Model.)
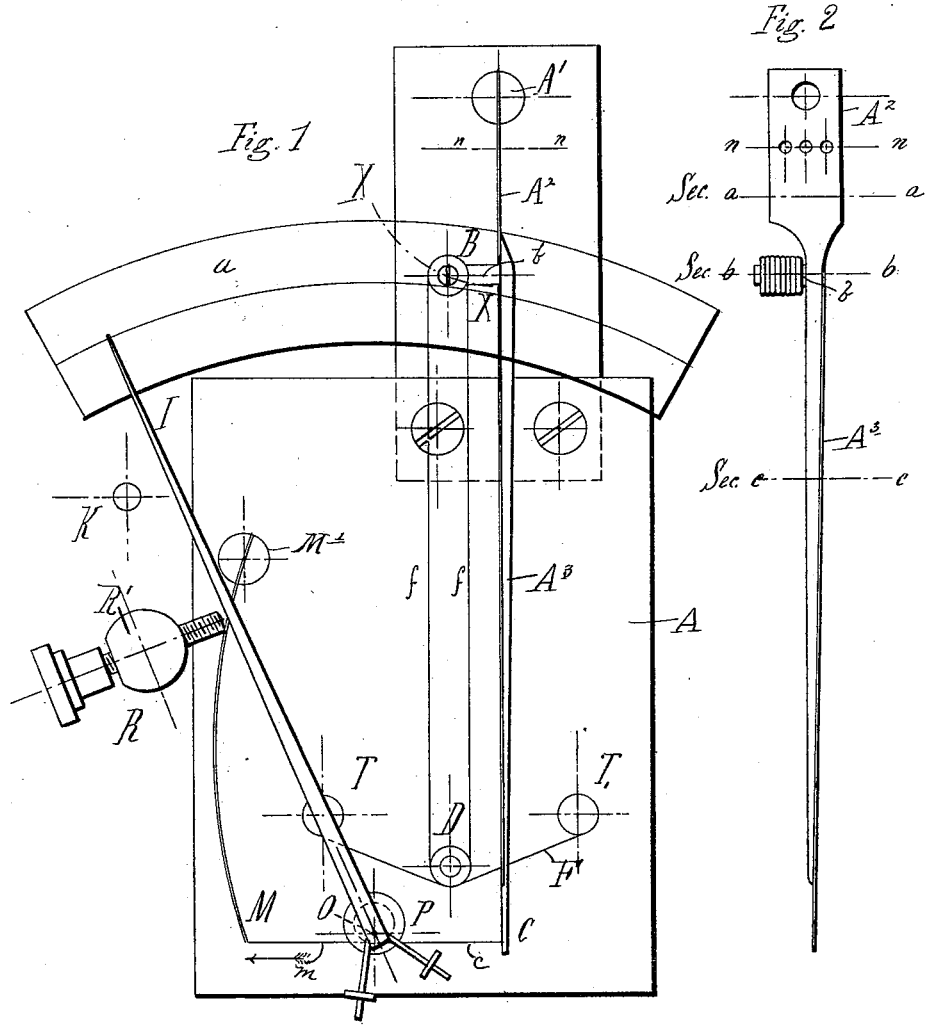
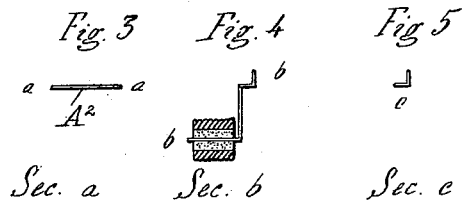
Witnesses
Inventor
Vittorio Arcioni

UNITED STATES PATENT OFFICE.

VITTORIO ARCIONI, OF IVREA, ITALY, ASSIGNOR TO CAMILLO OLIVETTI, OF SAME PLACE.

ELECTRICAL MEASURING INSTRUMENT.

SPECIFICATION forming part of Letters Patent No. 636,097, dated October 31, 1899.

Application filed May 10, 1899. Serial No. 716,299. (No model.)

*To all whom it may concern:*

Be it known that I, VITTORIO ARCIONI, a subject of the King of Italy, residing at Ivrea, Italy, have invented certain new and useful Improvements in Electrical Instruments, of which the following is a specification.

My invention relates to that class or type of electrical measuring instruments used to measure the potential in volts or the quantity in amperes of an electric current, either continuous or alternating.

It is the purpose of my invention to provide a measuring instrument in which the linear expansion of the wire conductor shall permit a wide range of movement to the index, means being used to multiply the vibrations, whereby it will extend over an arc greater than that usually calibrated in the instruments heretofore used. I aim also to provide a voltmeter or ammeter which shall be capable of giving accurate indications under all circumstances and in which the calibrations are substantially uniform in all parts of the graduated scale.

My invention also comprises other novel features, which will be fully described hereinafter and then particularly pointed out and defined in the claims.

For the purposes of the following explanation reference is had to the accompanying drawings, in which—

Figure 1 is an elevation showing the working parts of a measuring instrument constructed in accordance with my invention. Fig. 2 is a view showing the multiplying-arm removed from its post with its spool for the conducting-wire. Fig. 3 is a detail section of the same on the line $a\,a$, Fig. 2. Fig. 4 is a section upon the line $b\,b$ in said Fig. 2. Fig. 5 is a cross-section of the multiplying-arm on the line $c\,c$ in Fig. 2.

The reference-letter A in said drawings indicates the casing of the instrument, which is constructed in substantially the same manner as heretofore. It is provided with a calibrated plate $a$, over which the point of an index I has movement. This index has its axis at or near the point O, where there is a small pulley P, having an eccentric axis. This pulley carries the index I.

Supported on a post A' is a thin flexible or elastic plate $A^2$, which forms part of an arm $A^3$, which hangs straight down in the case. The arm is usually made of cast-steel, and in cross-section it has the form of an angle-plate to give it the required strength and stiffness. At or near the point where the thin plate $A^2$ unites with the angular arm is a projection $b$, at a right angle to the surface of the plate $A^2$, and upon the end thereof, at a short distance from the plate, is a spool B, arranged horizontally and parallel with the plate $A^2$. Said spool hangs directly over a second and similar spool D, which is placed not far from the axis O and is mounted rigidly upon the casing. Both spools are of any suitable insulating material.

The letters T and $T_1$ indicate the terminals of the instrument. The wire carrying the current is indicated by F, and it is led from the terminal T under the spool D, which has a series of circumferential grooves to receive said wire, and thence it is carried upward over the spool B, then down under the spool D in the next groove of the same, and so on, passing over the upper spool B and under the lower spool D until all the grooves are filled. The end of the wire is then led to the second terminal $T_1$ and fastened. This arrangement provides a series of parallel strands of wire $ff$ between the spools B and D, which are maintained at a suitable tension. The several strands are each separated from all the others by the grooves of the spools and the whole are properly insulated. The strain of the several strands $f$ transmitted from the fixed spool D to the spool B on the multiplier-arm, will have a tendency to force the lower extremity of said arm toward the right hand in Fig. 1 or away from the axis O and pulley P. Said end C of the multiplying-arm is connected by a light flexible wire $c$ to the pulley P, upon the circumference of which it is wound and fastened to prevent slipping. On said pulley a similar wire $m$ is attached in like manner, save that it is wound in the opposite direction, and its end is secured to the end of a leaf-spring M, which lies substantially on a level with the end C of the arm, the other end of said spring being rigidly mounted in a post M', projecting from the casing. The tension of this spring is so adjusted that it does not quite equal the strain of the wire strands $f$ when the latter are at normal temperature, whereby the latter will when there is no current passing throw the index I over to zero, as seen in Fig. 1. When current is flowing over the wire F, the heat produced therein and the resulting expansion of the wire diminish the strain between the spools B and D, so that the spring M is able to overcome the force tending to carry the end C of the arm $A^3$ away from the pulley P. The latter, therefore, will be turned by the pull of the spring M upon the wire $m$, and the point of the index I will be moved over the calibrated plate a space proportionate to the degree of heat developed in the wire by the current.

The pulley P is on an eccentric axis O in order that the successive displacements of the index I may be uniform in extent, thus avoiding the necessity of increasing the divisions of the calibrated plate.

A set-screw R is tapped through a post R', so that the point of the screw will bear against the spring M at a point suitably near the post M'. This screw is used to set the point of the index I accurately at zero on the calibrated plate, and in packing the instrument for transportation said screw can be so manipulated that the index will be drawn against the stud K, which will afford a support for it during transit.

To prevent variations of temperature of the external atmosphere from destroying the accuracy of the indications of the instrument, the casing has such a coefficient of thermal expansion that when the temperature rises or falls the part between the points D and A expands or contracts equally with the part of the multiplying-arm between the points B and A plus the length of the wire between D and B.

When used to measure potential, as a voltmeter, the strands $ff$ of wire should be numerous and of small diameter, with the strain equally divided between the strands.

When used to measure the current in amperes, the wire F will be of greater diameter, and as it will have more tensile strength the number of strands $ff$ can be diminished, and in certain cases a single strand only will be required. The spools B and D may then be dispensed with and the wire joined directly to the two points where said spools are located in any suitable manner.

To increase its flexibility and to locate the point where the flexion will mainly take place, I form small punctures or openings $n\ n$ in the plate $A^2$. It is desirable that the flexibility shall be wholly or mainly located in this plate and not in the arm, which is stiffened, as already described, by being made angular in cross-section.

What I claim as my invention, and desire to secure by Letters Patent of the United States, is—

1. An electrical measuring instrument having an index movable over a calibrated plate, a spring acting upon said index in one direction, a multiplying-arm supported rigidly at one end and having its other end connected to the index to counteract the action of the spring, and a wire connecting the terminals of the instrument and secured to insulated points between said terminals, one point being on the multiplying-arm near the point of support of the latter, and the other insulating-point being rigid on the case near the axis of the index, substantially as described.

2. In an electrical measuring instrument, for indicating the potential, or the quantity of electric currents, the combination with an index movable over a calibrated plate, of a spring acting on said index in one direction, a multiplying-arm hanging from a post in the casing and having its lower end connected to the index to counteract the spring, and a wire connecting the terminals of the instrument and secured to insulated points between said terminals, one point being a spool forming part of a projection on the multiplying-arm near its support and a spool on the casing, near the lower end of the arm, substantially as described.

3. In an electrical measuring instrument, the combination with an index which is movable over a calibrated plate, of a spring to move said index in one direction, a multiplying-arm which is flexible at one end and rigidly mounted by said end, in a post, the other end of said arm being connected to the index to counteract the spring, and a wire connected to one of the terminals of the instrument and carried thence under a rigid spool, then over a second spool rigidly mounted on the multiplying-arm then under the first spool, and, after a suitable number of turns on said spools, to the second terminal, substantially as described.

4. In an electrical measuring instrument, the combination with an index which is movable over a calibrated surface, of a spring acting on said index to produce movement in one direction, a multiplying-arm which is flexible at one end which is provided with a series of punctures, said end being rigidly mounted in a post from which said arm hangs downward, its lower end being connected to the index to counteract the spring, and a wire wound over an insulated spool mounted on a projection from said multiplying-arm at or near a point between its flexible end and rigid body portion, then under a like spool rigidly attached to a support near the lower end of said multiplying-arm, the ends of said wire being connected to the terminals of the instrument and the strands between the two spools being of a number suited to the measurements indicated by the instrument and maintained under tension at normal temperatures, substantially as described.

5. In an electrical measuring instrument, the combination with an index, of an eccentric pulley on which one end of said index is mounted, a spring having its end connected by a flexible wire to said pulley, a multiplying-arm hanging from a post in the upper part of the casing, its lower end being connected by a flexible wire to the eccentric pulley to counteract the action of the spring, and a wire wound over and under two grooved, insulated spools, one forming part of a projection from the multiplying-arm near its supported end, and the other being rigidly fixed in the casing near the lower end of said arm, the ends of said wire being secured to the terminals of the instrument, substantially as described.

6. In an electrical measuring instrument, the combination with an index, of a leaf-spring having one end fixed in a post and the other end connected to said index, a multiplying-arm hanging from a post and having its lower end connected to the index to counteract the spring, a wire connected under tension to a spool rigid on the casing near the lower end of the multiplying-arm and to a like spool forming part of a projection from the upper part of said arm, the ends of said wire being connected to the terminals of the instrument, and a set-screw tapped through a post in the casing and having its end adapted to bear on the spring, to set the index, substantially as described.

In testimony whereof I hereunto set my hand in presence of two subscribing witnesses.

VITTORIO ARCIONI.

Witnesses:
 FUMENE ERNESTE,
 ENRICO MARANA.